(12) United States Patent
Tan et al.

(10) Patent No.: US 6,354,120 B1
(45) Date of Patent: Mar. 12, 2002

(54) VEHICLE LOCKING SYSTEM

(75) Inventors: Budi Tan, Endeauvour Hills; Gianfranco Pavatich, Keilor Downs, both of (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,571

(22) PCT Filed: Sep. 2, 1998

(86) PCT No.: PCT/DE98/02573

§ 371 Date: Jun. 7, 2000

§ 102(e) Date: Jun. 7, 2000

(87) PCT Pub. No.: WO99/14085

PCT Pub. Date: Mar. 25, 1999

(30) Foreign Application Priority Data

| Sep. 12, 1997 | (AU) | PO 9181 |
| Sep. 26, 1997 | (AU) | PO 9480 |
| Dec. 22, 1997 | (AU) | PP 1089 |
| Jul. 16, 1998 | (AU) | 76283/98 |

(51) Int. Cl.[7] .............................................. B60R 25/02
(52) U.S. Cl. ....................... 70/252; 70/239; 70/DIG. 30
(58) Field of Search .......................... 70/239, 248, 252, 70/358, DIG. 30; 340/5.1, 5.21, 5.31

(56) References Cited

U.S. PATENT DOCUMENTS

| 4,232,538 A | * | 11/1980 | Detloff, Jr. ................... 70/239 |
| 4,520,640 A | * | 6/1985 | Kramer ........................ 70/248 |
| 4,747,278 A | * | 5/1988 | Roncelli et al. ............... 70/201 |
| 4,761,645 A | | 8/1988 | Mochida |
| 5,036,687 A | | 8/1991 | Takeuchi et al. |
| 5,129,494 A | * | 7/1992 | Rolinski et al. |
| 5,197,356 A | * | 3/1993 | Kobayashi et al. ........... 477/99 |
| 5,251,723 A | * | 10/1993 | Rolinski et al. .............. 477/96 |

FOREIGN PATENT DOCUMENTS

| DE | 44 36 326 | 10/1995 |
| EP | 0 742 127 | 11/1996 |
| EP | 0 794 095 | 9/1997 |
| WO | WO 92 16395 | 10/1992 |

* cited by examiner

Primary Examiner—William A. Cuchlinski, Jr.
Assistant Examiner—Gertrude Arthur
(74) Attorney, Agent, or Firm—Kenyon & Kenyon (57) ABSTRACT

A lock system for a vehicle, including an authentication module for receiving authentication code transmitted from a remote electronic key and for generating an authentication signal, and an ignition lock assembly having an ignition switch unit, a part movable between at least first and second positions to activate the ignition switch unit, an electronic lock module responsive to the authentication signal for generating a lock release signal, and a lock mechanism which inhibits use of the vehicle and in response to the lock release signal enables use of the vehicle.

21 Claims, 7 Drawing Sheets

VEHICLE LOCKING SYSTEM

FIELD OF THE INVENTION

The present invention relates to a lock system for a vehicle.

BACKGROUND INFORMATION

Most ignition lock systems for vehicles require an ignition key with a mechanically coded shaft to be inserted into a lock barrel and rotated to activate an ignition switch of the system. Only a mechanically coded key that corresponds to the lock barrel can be used to activate the ignition switch and start the vehicle. The mechanical lock assemblies used in the ignition locks are relatively expensive to implement and provide less security than that which is available with electronic systems used for vehicle entry. Accordingly, it would be advantageous to provide an ignition lock system which alleviates or minimizes these disadvantages or at least provides vehicle manufacturers with a useful choice.

SUMMARY

In accordance with the present invention, a lock system for a vehicle, is provided. The lock system includes
  an authentication device for receiving authentication code transmitted from a remote electronic key and for generating an authentication signal. The lock system further includes
  an ignition lock assembly having:
    an ignition switch unit;
    a part movable between at least first and second positions to activate the ignition switch unit;
    electronic lock means responsive to the authentication signal for generating a lock release signal; and
    a lock mechanism which inhibits use of the vehicle and in response to the lock release signal enables use of the vehicle.

The present invention further includes an electronic system for an ignition and steering lock assembly. The electronic system includes:
  an authentication device for receiving authentication code transmitted from a remote electronic key and for generating an authentication signal. An electronic lock device of the assembly is responsive to the authentication signal for generating a lock release signal to release a lock mechanism of the assembly. An ignition switch unit of the assembly generates signals representative of the position of movable part of the assembly for the electronic lock assembly, the part being movable between at least first and second positions to activate the ignition switch unit.

The present invention further provides a lock system for a vehicle, including:
  a steering lock tongue which is biased to actuate a steering lock mechanism;
  a lock mechanism for preventing movement of the lock tongue to actuate the steering lock mechanism; and
  an electronic lock device for controlling the lock mechanism, so that the lock tongue is released and is able to engage the steering lock mechanism when predetermined data is received.

DETAILED DESCRIPTION

Figure 1:
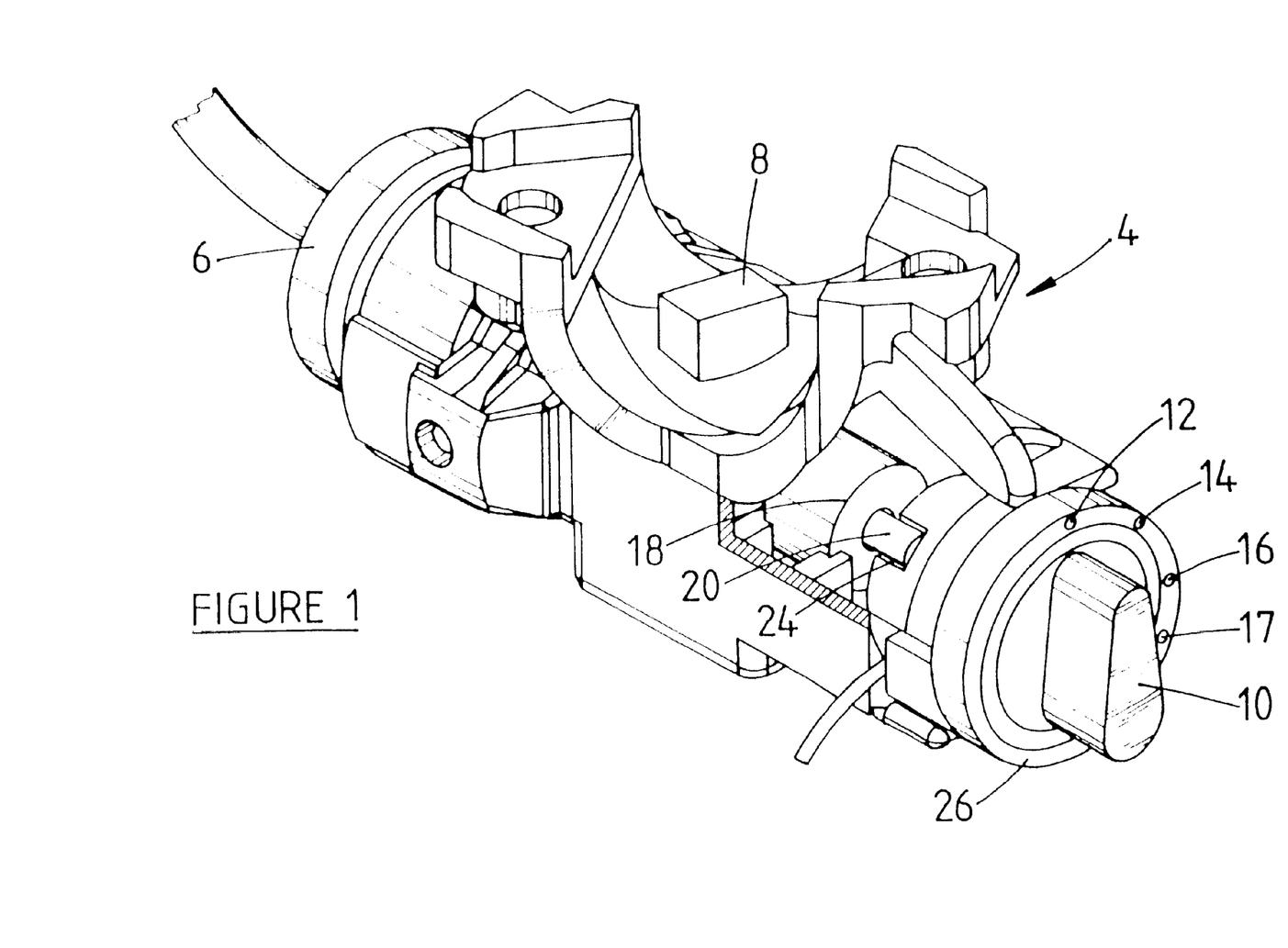
FIG. 1 is an isometric, partial cross-sectional, view of an example embodiment of an ignition lock assembly of an ignition lock system.
Figure 2:
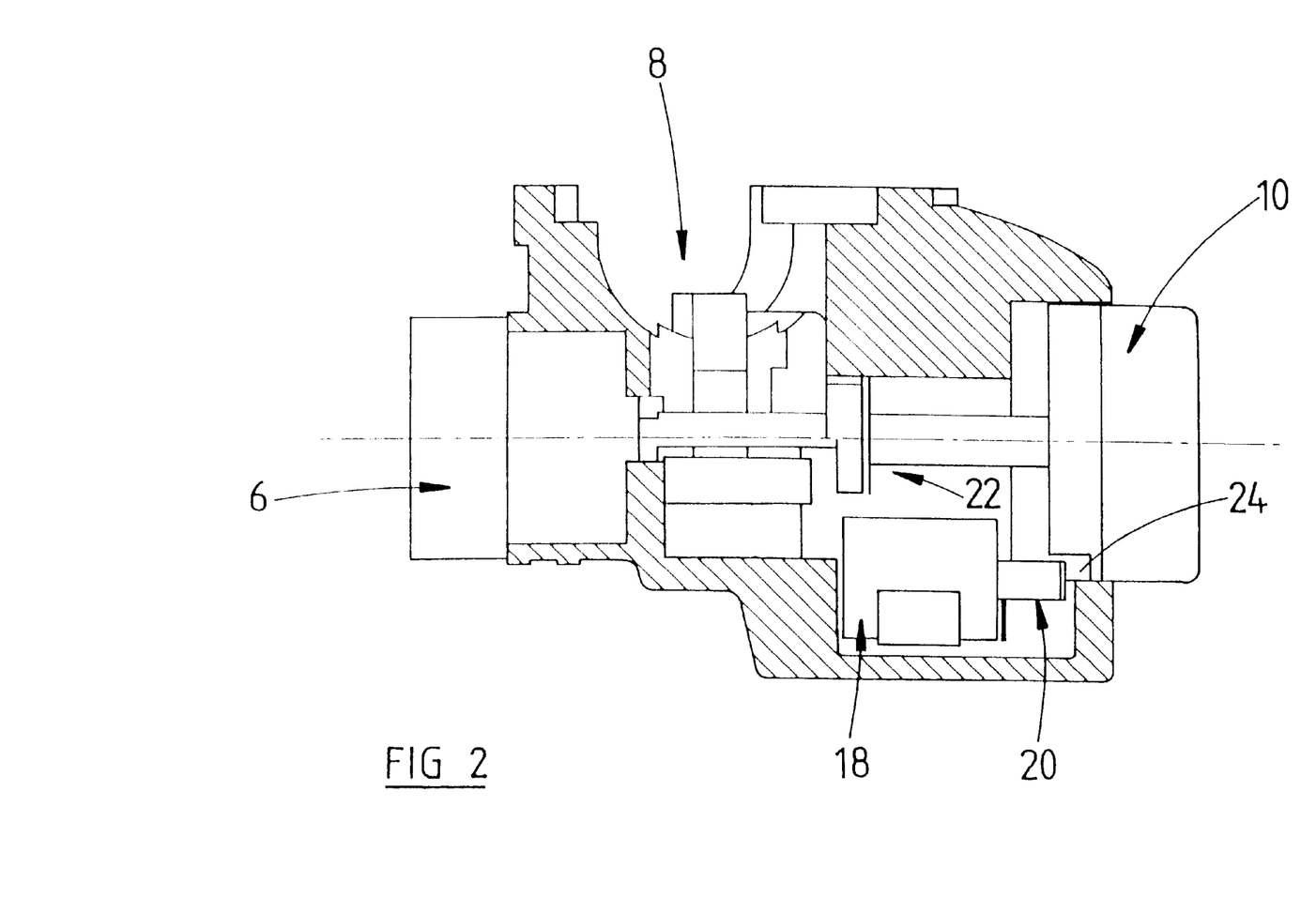
FIG. 2 is a partial cross-sectional view of the ignition lock assembly.

An ignition and steering lock assembly 4 of an ignition lock system, as shown in FIGS. 1 and 2, includes a standard ignition switch 6, a standard steering lock mechanism, having a lock tongue 8, and a rotary knob 10 which can be rotated between an OFF position 12, an ACC position 14 and IGN position 16 and a fourth optional and momentary START or CRANK position 17. The mechanical lock mechanism, which includes a lock barrel is however removed. The mechanical lock mechanism normally prevents movement of rotary knob 10, unless a corresponding mechanically coded key is inserted into assembly 4. Assembly 4, instead, includes a solenoid 18 with a movable locking plunger 20, which when extended prevents movement of rotary knob 10 between the OFF and ACC positions 12 and 14, unless vehicle access authorization is proven. Solenoid 18 is seated within the housing of assembly 4. Plunger 20 of solenoid 18 is spring loaded, which leaves the plunger in an extracted position when the solenoid is not energized.

When solenoid 18 is activated or energized, on access authentication, locking plunger 20 is retracted to allow rotary knob 10 to be moved between OFF and ACC positions 12 and 14. Rotary knob 10 is coupled by a shaft mechanism 22, as shown in FIG. 2, to ignition switch 6, so that rotation of knob 10 to IGN position 16 or optional START position 17 will activate ignition switch 6, initiate driver authentication and start the vehicle if driving authorization is proven.

The rotary knob 10, as shown in the Figures, includes a rear recessed portion 24 for receiving locking plunger 20 in OFF position 12. Once the vehicle has been started, rotary knob 10 is held in the START position, until a person positively switches off the vehicle by returning knob 10 to ACC or OFF positions 14 or 12. To proceed from ACC position 14 to OFF position 12 a push and turn movement is required. More particularly, knob 10 is pushed in while in ACC position 14 and then turned to OFF position 12 to enable steering lock activation. The vehicle is then locked by an electronic key 40, which may be a remote key, smart card or transponder of a passive entry system, to deactivate solenoid 18 via messages issued from a door lock module 30 to an ignition lock module 32, as described below. Key 40 can include two communication protocols, one for enabling vehicle entry and solenoid 18 to be energized, and a more secure protocol for communicating with the electronic system to enable starting of the vehicle, i.e., driver authentication.

Figure 3:
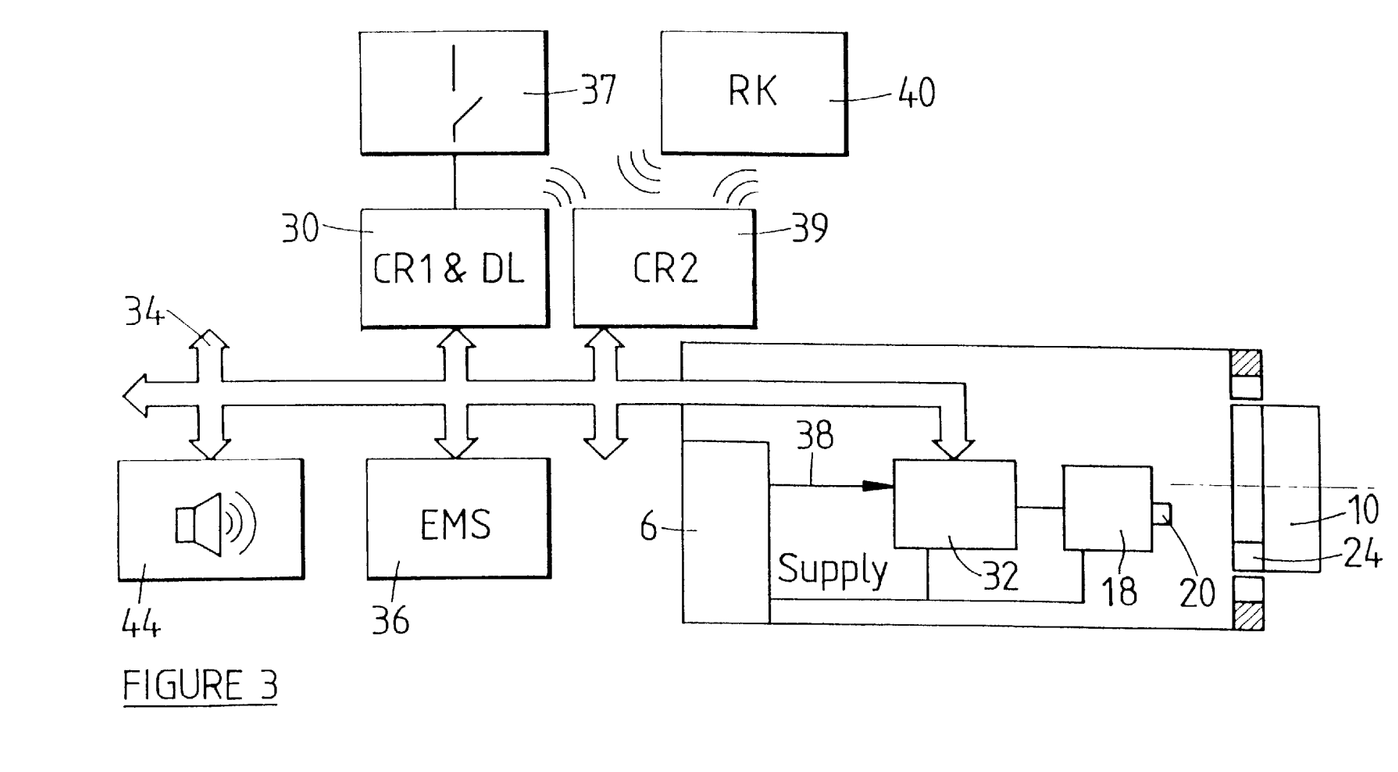
FIG. 3 is a block diagram of the ignition lock system.

An electronic system, as shown in FIG. 3, includes a door lock control module 30 having a code reader or transceiver, an ignition lock control module 32 for solenoid 18, a driver authorization reader or transceiver 39, which are connected by a bus system or Local Area Network (LAN) 34 within the vehicle. Bus system 34 also connects code reader 30 to the vehicle's Engine Management System (EMS) module 36 and a siren or sounder module 41. Ignition switch 6 generates switch position outputs 38, representative of the position of knob 10, which are coupled to ignition lock control module 32. These switch position outputs 38 are processed by ignition lock control module 32 and then made available to bus system 34 as status messages. Door lock module 30 communicates with key 40 to obtain an access authentication code which allows rotary knob 10 to be turned. Module 30, on interrogating the electronic key for the access authentication code, exchanges code, which may be encrypted, with EMS module 36 and ignition lock control module 32. Actuation of a door handle switch 37 of the vehicle will cause access interrogation to occur. Ignition lock control module 32 includes processing circuitry to validate the access authentication code, which may involve executing a decryption procedure. On validating access authentication code module 32 generates a drive signal for solenoid 18 to retract plunger 20, as shown in FIG. 3. This allows knob 10 to be turned and ultimately the vehicle to be started by turning knob 10 to ACC position 14 and then IGN position 16 or the optional START position, provided driving authorization is obtained.

The electronic key 40 may be implemented as remote control key with activation buttons or as a key or smart card without buttons in a passive entry system. Key 40 can rely on a communication signal by activation of switch 37 for activation of the communications protocol.

Access authorization and driving authorization are granted in two separate steps for reasons of theft security as well as operational safety. Access authorization affects solenoid 18, while driving authorization affects the success of an attempt to crank the engine of the vehicle. Once the engine is running, no authorization checks are required. During the authorization, key 40 needs to be within proximity of reader modules 30 and 39. The example sequence of steps for unlocking, driving and locking the vehicle is as follows:

1. Activate an access authentication procedure by a button of key 40 or activating door handle switch 37. Door module 30 sends an encrypted authentication message. Ignition lock module 32 receives the access authentication message and activates solenoid 18 to retract its plunger 20 for release of rotary knob 10.
2. The rotary knob 10 is pushed in and turned from OFF position to ACC position 14.
3. The rotary knob is turned from ACC position 14 to IGN position 16 or optional START position 17. The ignition signal feed provides an activation signal to module 39 to activate the driving authentication procedure. If driving authorization is proven module 39 places a driving authentication message on bus system 34 where it activates EMS module 36 causing it to start (crank) the engine.
4. When rotary knob 10 is turned from IGN position 16 to ACC position 14, the engine stops.
5. The knob 10 is pushed in while in ACC position 14 and turned to OFF position 12 to engage steering lock mechanism 8.
6. The vehicle is locked using a button on key 40 or door handle switch 37. This deactivates solenoid 18 via a bus message issued by door lock module 30 and sent to ignition lock module 32. The spring mounted in the solenoid pushes plunger 20 into the rear recessed receptacle 24 of rotary knob 10. This ensures knob 10 is locked if the vehicle is not driven after vehicle access.

If step 5 is missed by moving directly from step 4 to step 6, a warning signal is emitted and/or the door lock system will not activate. This prompts a user of the vehicle to return and execute step 5. Ignition lock control module 32 uses switch position outputs 38 to determine ignition lock status and a bus message can be output if it receives a lock message from door lock module 30 that does not conform or comply with current position of switch 6. This bus message is directed to door lock control module 30 and/or sounder module 41 for action. Door lock module 30 may ignore a request for actuation.

An alternative lock system 104, as shown in FIGS. 4 to 10, removes any requirement to provide a warning signal for actuation of the steering lock mechanism as it is automatically activated when the engine is turned off, the vehicle at rest and the doors locked. Alternatively, the steering lock mechanism can be engaged when it is detected that the doors are locked and electronic key 40 is out of range of reader modules 30 and 39.

Figure 4:
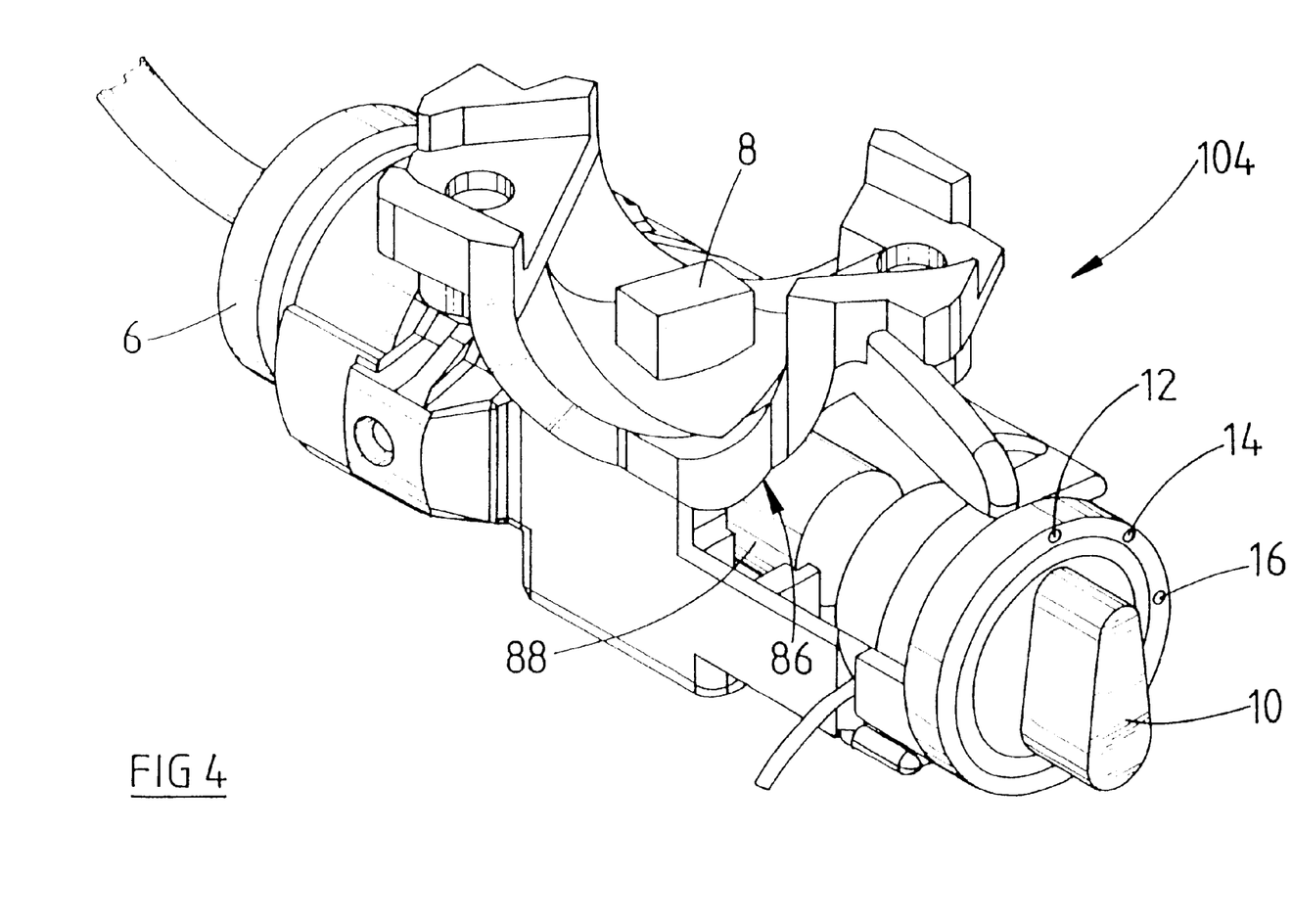
FIG. 4 is an isometric, partial cross-sectional, view of another example embodiment of a lock assembly.
Figure 5:
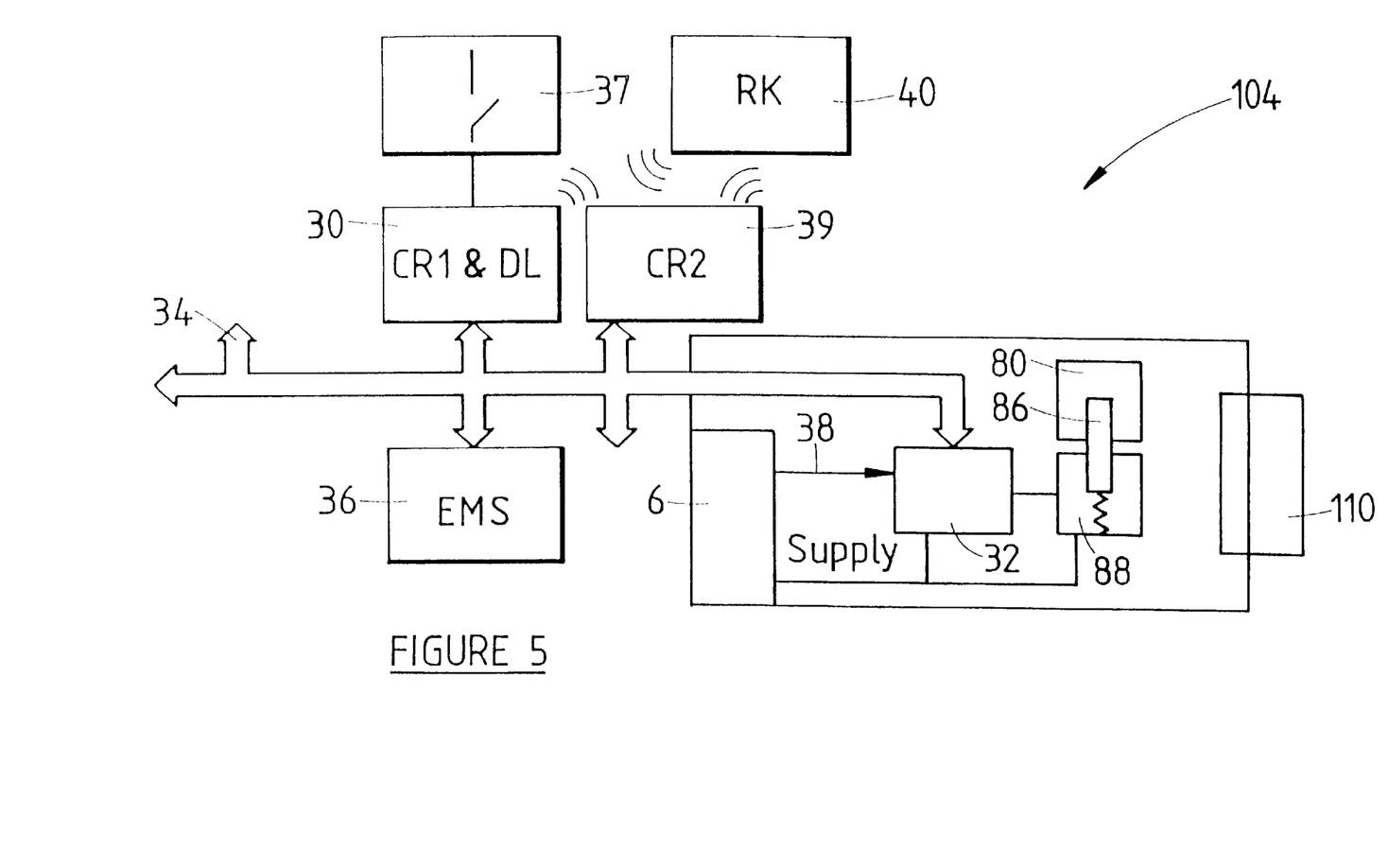
FIG. 5 is a block diagram of the lock assembly of FIG. 4.

The ignition and steering lock assembly 104 again does not include any mechanical ignition lock mechanism, as the lock barrel is removed, and again there is no provision whatsoever for insertion of a coded shaft ignition key into rotary knob 110. Also solenoid 18 for rotary knob 10 is replaced by an electromechanical blocking mechanism (EMB) 88 with a spring loaded plunger 86 which acts on lock tongue 80, as described below. EMB 88 may be a solenoid or a driven motor. Accordingly, there is no recessed portion 24 in knob 110. For ignition lock assembly 104, there is also no OFF position. Rotary knob 110 of assembly 104 is able to move between an ACC position 12 and an IGN position 14, and can also be moved from IGN position 14 to an optional and only momentary START or CRANK position 16.

Figures 6, 7:
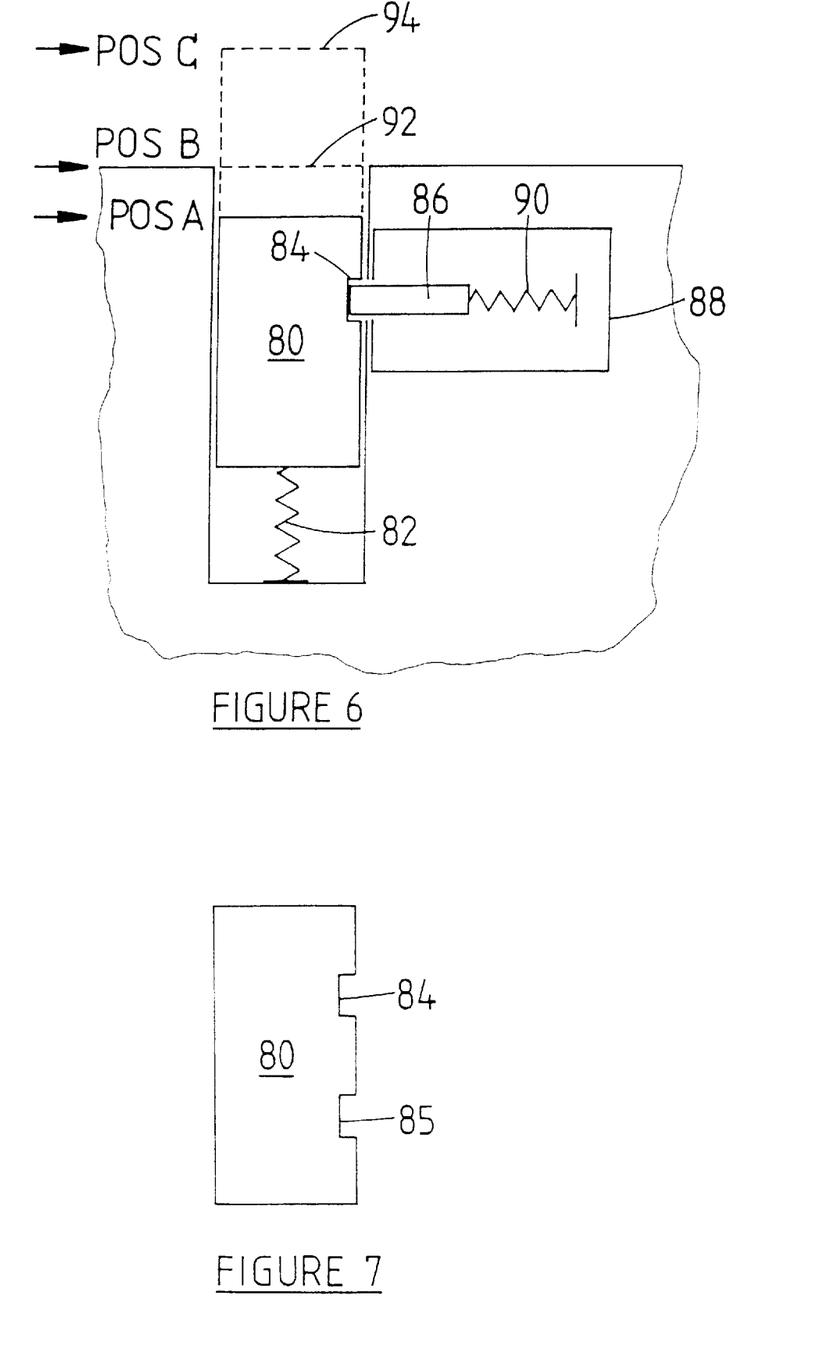
FIG. 6 is a block diagram of part of the assembly of FIG. 4.
FIG. 7 is a block diagram of an alternative lock tongue of the assembly of FIG. 4.

Automatic actuation of the steering lock mechanism is provided by incorporating in assembly 104 steering lock tongue 80, which is the same as lock tongue 8 in that it is spring loaded by a bias spring 82, except that it includes a side wall cavity 84, as shown in FIG. 6. Side wall cavity 84 is for receiving plunger 86 of EMB 88 which is electrically connected to lock module 32 for activation. When the driver is inside the car with the engine running, the steering lock mechanism will be disengaged and lock tongue 80 will be in the position, position A, as shown in FIG. 6. EMB 88 under the action of a bias spring 90 will cause plunger 86 to engage tongue 80 within cavity 84 so as to hold tongue 80 in position A. Tongue 80 can therefore only be released to engage the steering lock mechanism, by energizing EMB 88 and retracting plunger 86. Ignition lock module 32 will instruct this to occur when it detects that rotary knob 10 has been moved from IGN position 14 to ACC position 12, and module 32 also receives a signal or signals to indicate (1) the doors of the vehicle have been locked, and (2) the vehicle speed is zero. Lock tongue 80 will then be released to engage the steering lock mechanism under the action of tongue bias spring 82. Tongue 80 will move to position B indicated by dotted lines 92, when the steering wheel is not centered, and will then move to position C indicated by dotted lines 94, when the steering wheel does become centered. This ensures the steering lock mechanism can be engaged after a driver turns off the engine, the vehicle is stationary, and the doors have been locked. The steering lock mechanism can subsequently be released, as discussed previously, by pushing in and moving rotary knob 10.

Advantageously, lock assembly 104 can be configured so that the steering lock mechanism is mechanically linked to shaft 22 for movement of rotary knob 10, such that when lock tongue 80 is released to engage the steering lock mechanism, this also simultaneously invokes a lock mechanism to prevent movement of rotary knob 10, as described below.

For secure electronic release of rotary knob 10 and the steering lock mechanism, tongue 80 can be configured to include an additional cavity 85, as shown in FIG. 7, which is lower than first cavity 84, so that plunger 86 is received by lock tongue 80, when it is engaged in position C with the lock mechanisms engaged. This will ensure that the lock mechanisms can only then be released after an electronic release procedure involves EMB 88 being energized.

Figure 8:
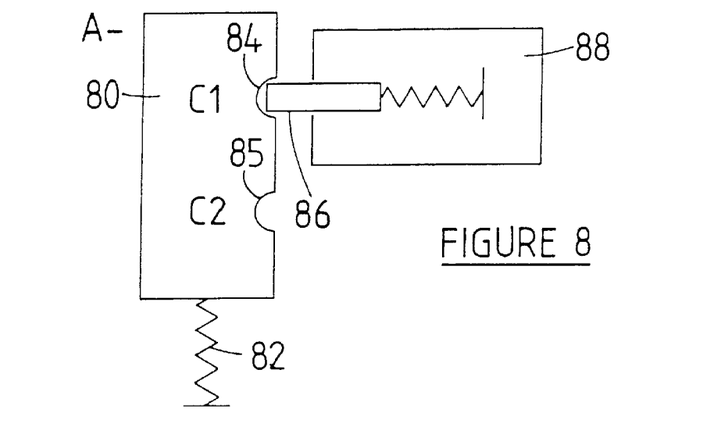
FIGS. 8 to 10 are schematic diagrams showing the different positions of the alternative lock tongue for different states of the lock assembly of FIG. 4.
Figure 9:
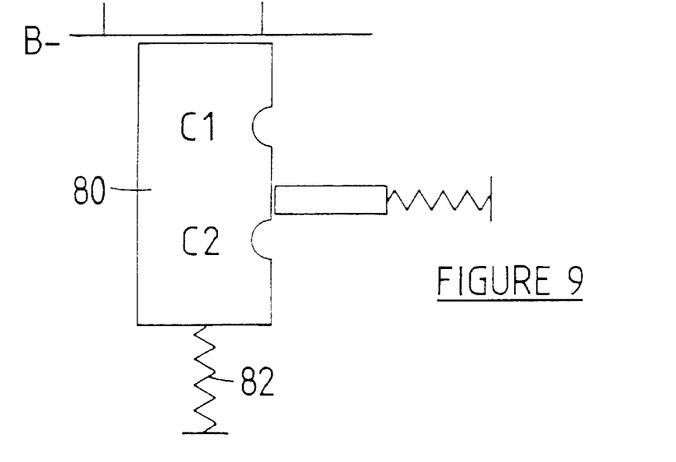
Figure 10:
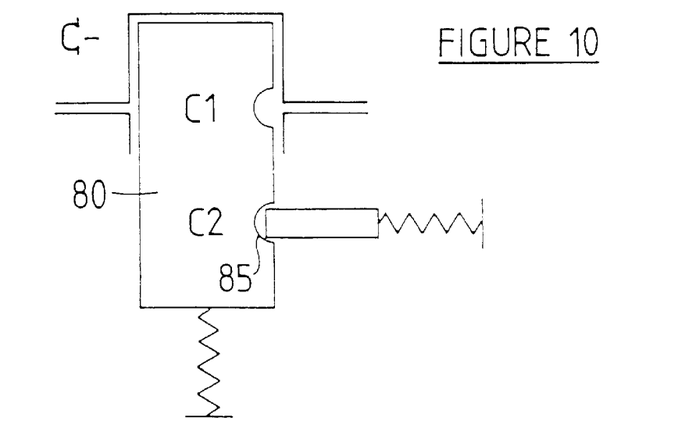

With lock tongue 80 including two cavities 84 and 85, as shown in FIGS. 8 to 10, while the vehicle is being driven, EMB 88 will have its plunger 86 engaging first cavity 84 so tongue 80 is in position A, as shown in FIG. 8. With lock tongue 80 in position A, the driver is free to move rotary knob 110 from IGN position 14 to ACC position 12 to turn off the engine. When, as described previously, the doors of the vehicle have been locked and the vehicle speed is zero, ignition lock module 32 will instruct EMB 88 to retract plunger 84 so as to release tongue 80 so it can move under the action of bias spring 82 to position B or C, depending on whether the steering wheel is centered. On subsequently entering the vehicle, the steering wheel is centered or is moved so as to become centered, lock tongue 80 will be in position C, as shown in FIG. 10, and the steering wheel lock mechanism will be engaged. With the steering lock mechanism also linked to the lock mechanism for rotary knob 110, it will not be possible to move rotary knob 110 from ACC position 12 to IGN position 14 or start position 16. In position C, plunger 86 of EMB 88 is extended by the action of its bias spring 90 so as to engage second cavity 85, thereby locking tongue 80 in position C. Accordingly, steering wheel nor rotary knob 110 of the vehicle can be moved unless the following release procedure is correctly executed. The release procedure involves:

(i) pushing in rotary knob 110 to initiate execution of the driver authentication procedure.

(ii) the ignition lock 132 detects pushing in of lock module 110 and instructs driver authorization reader 39 to interrogate electronic key 40.

(iii) when driver authorization is proven following execution of the driver authentication procedure, a positive message is passed to ignition module 32.

(iv) the ignition lock module 32 instructs EMB 88 to retract plunger 86, and the steering mechanism and ignition lock mechanism can be released by pushing in and turning rotary knob 110 and turning the steering wheel of the vehicle.

If desired, a second EMB can be included to act on the lock mechanism for rotary knob 110.

Many modifications are possible to those skilled in the art without departing from the scope of the present invention as hereinbefore described.

What is claimed is:

1. A lock system for a vehicle, comprising:
    an authentication device receiving an authentication code transmitted from a remote electronic key, and generating an authentication signal; and
    an ignition lock assembly including an ignition switch unit, a movable part movable between at least first and second positions to activate the ignition switch unit, an electronic lock device responsive to the authentication signal for generating a lock release signal, and a lock mechanism which prevents use of the vehicle and, in response to the lock release signal, enables use of the vehicle, the lock mechanism including a locking part which acts to prevent movement of the movable part between the first and second positions, and the lock mechanism allowing movement of the movable part when the lock release signal is received, the locking part acting to engage a lock tongue of the ignition lock assembly when the lock tongue is in a locked position to prevent movement of the lock tongue, the lock mechanism retracting the locking part to allow movement of the lock tongue when the lock release signal is received.

2. The lock system according to claim 1, wherein the locking part engages the moveable part in one of the first and second positions to prevent movement of the movable part.

3. The lock system according to claim 1, wherein the movable part is a rotatable knob which is coupled to the ignition switch unit.

4. The lock system according to claim 1, wherein the locking part acts to engage the lock tongue of the ignition lock assembly when the lock tongue is in an unlocked position to prevent movement of the lock tongue, the electronic lock device being responsive to a lock condition signal for generating the lock release signal, and the lock mechanism retracting the locking part to allow movement of the tongue when the lock release signal is received.

5. The lock system according to claim 4, wherein the lock condition signal indicates that doors of the vehicle are locked and that a speed of the vehicle is at a predetermined level.

6. The lock system according to claim 1, wherein the lock tongue includes a recess for receiving the locking part.

7. The lock system according to claim 1, wherein the lock tongue is biased to engage a steering lock mechanism.

8. The lock system according to claim 1, wherein the lock tongue includes two recesses for receiving the locking part.

9. The lock system according to claim 1, wherein the lock mechanism includes an electromechanical blocking mechanism with a plunger which is biased to extend and is retracted in response to the lock mechanism receiving the lock release signal.

10. The lock system according to claim 1, wherein the ignition switch unit generates signals representative of a position of the movable part, the signals being generated for the electronic lock device.

11. The lock system according to claim 5, wherein the electronic lock device causes generation of a warning signal when the movable part is in one of the positions which does not correspond to a lock signal received by the electronic lock device.

12. The lock system according to claim 1, wherein the electronic lock device instructs the authentication device to interrogate the electronic key for a driver authentication signal when the movable part moves between the first and second positions.

13. A lock system for a vehicle, comprising:
    an authentication device for receiving an access authentication code transmitted from a remote electronic key and for generating an authentication signal; and
    an ignition lock assembly including an ignition switch unit, a movable part movable between at least first and second positions to activate the ignition switch unit, an electronic lock device responsive to the authentication signal for generating a lock release signal, and a lock mechanism which prevents use of the vehicle and, in response to the lock release signal, enables use of the vehicle, the access authorization code being transmitted for access authentication.

14. The lock system according to claim 7, wherein the electronic lock device instructs the authentication device to interrogate the electronic key for a driver authorization signal when the movable part moves between the first and second positions.

15. The lock system according to claim 7, wherein the electronic lock device causes generation of a warning signal when the movable part is in one of the positions which does not correspond to a lock signal received by the electronic lock device.

16. The lock system according to claim 7, wherein the lock mechanism includes a locking part which acts to prevent movement of the moveable part between the first and second positions, and the lock mechanism allows movement of the moveable part when the lock release signal is received.

17. A lock system for a vehicle, comprising:

a lock tongue biased to actuate a steering lock mechanism;

a lock mechanism for preventing movement of the lock tongue to actuate the steering lock mechanism, the lock mechanism including a locking part which acts to engage a the lock tongue when the lock tongue is in an unlocked position to prevent movement of the lock tongue; and an electronic lock device for controlling the lock mechanism to enable the lock tongue to engage the steering lock mechanism when predetermined data are received, the electronic lock device being responsive to a lock condition signal for generating the lock release signal, the lock mechanism retracting the locking part to allow movement of the lock tongue when the lock release signal is received.

18. The lock system according to claim 11, wherein the predetermined data include the lock condition signal.

19. The lock system according to claim 13, wherein the lock condition signal indicates that doors of the vehicle are locked and that a speed of the vehicle is at a predetermined level.

20. The lock system according to claim 11, wherein the lock tongue includes a recess for receiving the locking part.

21. The lock system according to claim 11, wherein the lock tongue includes two recesses for receiving the locking part, the locking part acting to engage the lock tongue when the lock tongue is in a locked position to prevent movement of the lock tongue.

* * * * *

UNITED STATES PATENT AND TRADEMARK OFFICE
CERTIFICATE OF CORRECTION

PATENT NO. : 6,354,120 B1
DATED : March 12, 2002
INVENTOR(S) : Tan et al.

It is certified that error appears in the above-identified patent and that said Letters Patent is hereby corrected as shown below:

Column 1,
Line 24, change "vehicle," to -- vehicle --

Column 2,
Line 12, delete "and"

Signed and Sealed this

Seventeenth Day of June, 2003

JAMES E. ROGAN
*Director of the United States Patent and Trademark Office*